United States Patent [19]

Lundberg et al.

[11] Patent Number: 4,536,539

[45] Date of Patent: Aug. 20, 1985

[54] DILATANT BEHAVIOR OF INTERPOLYMER COMPLEXES IN AQUEOUS SOLUTION

[75] Inventors: Robert D. Lundberg, Bridgewater; Dennis G. Peiffer, East Brunswick; Ilan Duvdevani, Leonia, all of N.J.

[73] Assignee: Exxon Research and Engineering Co., Florham Park, N.J.

[21] Appl. No.: 681,389

[22] Filed: Dec. 13, 1984

Related U.S. Application Data

[63] Continuation-in-part of Ser. No. 560,519, Dec. 12, 1983, abandoned.

[51] Int. Cl.$^3$ .................... C08L 33/00; C08L 33/06; C08L 41/00
[52] U.S. Cl. .................... 524/521; 523/175; 260/DIG. 31; 524/501; 524/504; 524/516; 524/800; 524/803; 524/804; 524/832
[58] Field of Search ............ 260/DIG. 31; 523/175; 524/800, 803, 804, 832, 501, 504, 516, 521; 525/203, 919

[56] References Cited

U.S. PATENT DOCUMENTS

| | | | |
|---|---|---|---|
| 3,432,454 | 3/1969 | Hibbard | 524/501 |
| 3,454,676 | 7/1969 | Busse | 260/DIG. 31 |
| 3,546,142 | 12/1970 | Michaels et al. | 524/501 |
| 3,660,338 | 5/1972 | Economou | 524/501 |
| 3,779,969 | 12/1973 | Slagel et al. | 523/175 |
| 3,867,330 | 2/1975 | Frisque | 524/521 |
| 3,868,432 | 2/1975 | Keegan et al. | 524/516 |
| 3,926,890 | 12/1975 | Huang et al. | 524/832 |
| 3,969,434 | 7/1976 | Powell et al. | 260/DIG. 31 |
| 4,040,984 | 8/1977 | Sharpe et al. | 524/521 |
| 4,088,623 | 5/1978 | Pearl | 523/175 |
| 4,134,870 | 1/1979 | Makowski et al. | 260/DIG. 31 |
| 4,145,379 | 3/1979 | Lundberg et al. | 260/DIG. 31 |
| 4,151,137 | 4/1979 | Duvdevani et al. | 260/DIG. 31 |
| 4,153,055 | 5/1979 | Etes | 524/521 |
| 4,196,236 | 4/1980 | Lundberg et al. | 260/DIG. 31 |

FOREIGN PATENT DOCUMENTS 1054784  5/1979  Canada .................... 523/175

*Primary Examiner*—Ronald W. Griffin
*Attorney, Agent, or Firm*—Richard E. Nanfeldt

[57] ABSTRACT

The present invention relates to aqueous solutions having dilatant properties in which the aqueous solution contains a polymer complex which is a water soluble polymer backbone containing an anionic comonomer and a copolymer of a water soluble polymer backbone containing a cationic comonomer.

6 Claims, No Drawings

DILATANT BEHAVIOR OF INTERPOLYMER COMPLEXES IN AQUEOUS SOLUTION

CROSS REFERENCE TO RELATED APPLICATIONS

This application is a continuation-in-part application of copending Ser. No. 560,519, filed Dec. 2, 1983, now abandoned.

FIELD OF THE INVENTION

The present invention relates to aqueous solutions having dilatant properties in which the aqueous solution contains an interpolymer complex which is a water soluble polymer backgone containing an anionic comonomer and a copolymer of a water soluble polymer backbone containing a cationic comonomer.

BACKGROUND OF THE INVENTION

In recent years, interpolymer complexes have received considerable attention in the literature due to their interesting and unique properties. In most instances, these complexes are formed by intimately mixing aqueous solutions containing high-charge density polyelectrolytes possessing opposite charge. When these polymer molecules meet in solution, the interaction between oppositely charged sites will cause the release of their associated counterions forming the complex. The counterions are now free to diffuse into the bulk solution. Normally, phase separation occurs upon prolonged standing in these high-charged density complexes. As a result, these materials have poor rheological properties. In recent work we have found that low-charge interpolymer complexes are soluble and effective in viscosifying aqueous solution systems. More importantly, these complexes possess a substantially higher viscosity than the corresponding individual low-charge density copolymer components. These characteristics are unexpected since high-charge density complexes are insoluble in these conventional solution systems. Therefore, it is anticipated that few detailed rheological studies of these latter materials appear in the literature. In particular, shear rate measurements are markedly absent.

Polymeric materials are useful as viscosity enhancers when dissolved in the appropriate solvent system. The principle reason for this behavior is due primarily to the large volume which a single macromolecular chain can occupy within the solvent. An increase in the size of the chain produces a concomitant enhancement in the solution viscosity. However, when the polymer chain is placed in a shear field, segmental orientation takes place in the direction of the shearing force. The viscosity of the fluid dramatically drops due to this orientation phenomena. Such shear thinning behavior is typical of most solutions containing dissolved polymer materials. However, if the polymer molecule has a very high molecular weight with a relatively flexible backbone and the solvent viscosity is sufficiently high, different behavior can be anticipated. It has been shown by several groups that, with increasing shear rates, the viscosity should show a decrease, followed by a minimum value and a subsequent small increase in cases where both solvent viscosity and polymer molecular weight are very high. This latter effect gives rise to a very mild dilatant behavior. However, the above-mentioned conditions required for the appearance of shear thickening behaviour in these polymeric solution systems are not applicable for many technologically interesting fluids. In most of the common synthetic polymers, it is difficult from a synthetic viewpoint to obtain sufficiently high molecular weight and even when obtained it is easily degraded under shear, in addition, most solvents (for example, water) have rather low viscosities.

This invention discloses the novel and unexpected result that soluble interpolymer complexes of lower molecular weight are capable of enhancing the viscosity of aqueous solutions under relatively broad shear conditions. With these unique polymeric materials, dilatant behaviour occurs in aqueous fluids which are of extreme technological utility. It is further observed that under the identical experimental conditions, the viscosity of the individual copolymer components show the normal shear thinning behavior.

Polymers with very high molecular weight can be used to modify a solvent for a variety of technological applications. In this invention it is disclosed that an alternative to ultra high molecular weight additives are lower molecular weight polymers which are capable of associating in solution, thereby building a network of a very high molecular weight. A way for achieving such networks is the complexation of two dissolves polymers, one having anionic charges along its backbone and the other having cationic charges along its backbone. The complex can be achieved by dissolving each polymer alone in the solvent and combining the two solutions. Alternatively, each polymer can be codissolved in the same solution system. When polymer moleculees of opposite charges meet in solution, an interaction occurs between oppositely charged sites forming a complex which involves the associated counterions that may have been present in one or both polymers. The interaction of the two polymers in solution is not an acid-base neutralization reaction which would occur at a stoichiometric ratio of anionic/cationic polymer of 1/1 but is a formation of a polymer complex.

In order to avoid phase separation of the complex in solution, the charge density along the polymer backbones should be relatively low. The resulting solution of such a complex is then significantly more viscous than solutions containing the individual polymers, provided that the total numbers of negative and positive charges are correctly balanced. Upon addition of a strongly polar agent such as water soluble inorganic salts alcohol the complex can be disturbed and the viscosity reduced.

It was found that for a given balance of the various parameters that may be varied in an interpolymer complex solution, an unexpected shear thickening (dilatant) behaviour may be obtained. These parameters include:

Backbone nature of each of the polymers (or copolymers).

The charge densities along the polymer backbones.

The molecular weight of each polymer.

The ratio between the polymers introduced into solution.

The solvent (and cosolvent, if any).

The concentration of polymer in solution.

As explained above, most solutions of high molecular weight polymers are expected to exhibit a shear thinning behaviour. Interpolymer complexes under narrow conditions seem on the other hand to possess an ability to establish even larger networks or act as if networks are larger under high shear rates resulting in shear thickening.

For example, shear thickening behavior can be useful in affecting antimisting characteristics. Such a solution can behave as a fairly low viscosity fluid at low shear rates. However, the viscosity begins to rise as the shear rate is progressively increased. Accordingly, the solution can more effectively resist breakup into a mist of minute droplets. This is a very desirable attribute in a variety of fluids of technological interest. Another desirable attribute is to be able to reverse (or erase) the above-mentioned antimisting behaviour and render it atomizable. With regard to interpolymer complexes, this is readily achieved through addition of a soluble component capable of weakening or totally disrupting the ionic linkages which hold the complex together. Such a component should be highly polar, soluble in the solution containing the dissolved interpolymer complex and capable of efficiently migrating (and disrupting) to the ionic linkages. Water soluble salts, acids, bases and amines are some possible examples.

SUMMARY OF THE INVENTION

The present invention relates to aqueous solutions having dilatant properties in which the aqueous solution contains a polymer complex which is a water soluble polymer backbone containing an anionic comonomer and a copolymer of a water soluble polymer backbone containing a cationic comonomer.

GENERAL DESCRIPTION OF THE INVENTION

The aqueous solution of the instant invention, which exhibits dilatant properties, is formed by the interaction of a mixture of two different polymers in aqueous solutions. There are a number of copolymers which are suitable for forming the complexes.

A preferred system is comprised of a mixture of (A) copolymers of acrylamide and a neutralized styrene sulfonate where the sulfonate content ranges from about 0.1 weight percent up to about 50 weight percent and (B) copolymers of acrylamide and a quaternary ammonium salt such as methacrylamidopropyltrimethylammonium chloride:

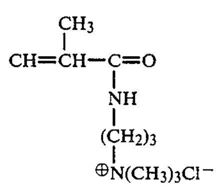

(MAPTAC)

wherein the level of ionic monomer again ranges from about 0.1 mole percent to about 50 mole percent.

Alternatively, a preferred system comprises a mixture in an aqueous solution of a sulfonated copolymer and cationic monomer containing copolymer.

The number of ionic groups contained in the individual copolymers of the polymer complex is a critical parameter affecting this invention. The number of ionic groups present in the polymer can be described in a variety of ways such as weight percent, mole percent, number per polymer chain, etc. For most polymer systems of interest in this invention, it is desirable to employ mole percent. For vinyl homopolymers, such as polyacrylamide, the sulfonated analog having a sulfonate content of 1.0 mole percent means that one out of every 100 monomer repeat units in the polymer chain is sulfonated. In the case of copolymers, the same definition applies, except for the purposes of this calculation, the polymer can be considered to be prepared from a hypothetical monomer having an average molecular weight, which is the average of the two monomer components.

A variety of other polymer systems can be employed in this invention with the following constraints. Copolymers (A) and (B) should be based on largely water soluble polymer backbones containing an anionic or cationic comonomer respectively. The nonionic water soluble monomer component of copolymer (A) and (B) is selected from the group consisting of acrylamide, N,N dimethylacrylamide, alkyl substituted acrylamides, n-vinyllactones, methacrylates, vinylpyrolidone, ethylene oxide, vinyl alcohol and methacrylamide and the like wherein acrylamide is preferred. The anionic comonomer of copolymer (A) is selected from the group consisting of styrene sulfonate, vinyl sulfonate, allyl sulfonate, acrylate, 2-sulfoethylmethacrylate acrylic acid, 2-methyl propane sulfonic acid, (methyl)acrylic acid, and the like, wherein the sulfonate groups are neutralized with an ammonium cation or a metal cation selected from the group consisting of Groups IA, IIA, IB and IIB of the Periodic Table of Elements. The cationic comonomer of copolymer (B) is selected from the group consisting of methacrylamidopropyltrimethylammonium chloride, dimethyldiallylammonium chloride, diethyldiallylammonium chloride, 2-methacryloxy-2-ethyltrimethylammonium chloride, trimethylmethacryloxyethylammonium methosulfate, 2-acrylamido-2-methylpropyltrimethylammonium chloride, vinylbenzyltrimethylammonium chloride, and the like. Copolymer (A) or (B) contains about 0.1 to about 50 mole percent of the anionic comonomer, more preferably about 0.5 to about 30 and most preferably about 1 to about 10. The number average molecular weight of copolymer (A), as determined for example by osmotic pressure measurements or gel permeation chromatography, is about $10^4$ to about $10^8$, more preferably about $10^5$ to about $10^7$, and most preferably about $10^5$ to about $10^6$.

Alternatively, the molecular weight, as derived from intrinsic viscosities, for the copolymers of acrylamide/-sodium styrene sulfonate (or methacrylamidopropyltrimethylammonium chloride) is about $1\times10^4$ to about $1\times10^8$, more preferably about $1\times10^5$ to about $1\times10^7$ and most preferably about $1\times10^5$ to about $1\times10^6$. The means for determining the molecular weights of the water soluble copolymers from the viscosity of solutions of the copolymers comprises the initial isolation of the water soluble copolymers, purification and redissolving the copolymers in water to give solutions with known concentrations at an appropriate salt level (normally sodium chloride). The flow times of the solutions and the pure solvent were measured in a standard Ubbelhode viscometer. Subsequently, the reduced viscosity is calculated through standard methods utilizing these values. Extrapolation to zero polymer concentration leads to the intrinsic viscosity of the polymer solution. The intrinsic viscosity is directly related to the molecular weight through the well-known Mark-Houwink relationship.

Copolymers (A) and (B) are prepared by a free radical copolymerization in an aqueous medium which comprises the steps of forming a reaction solution of acrylamide monomer and sodium styrene sulfonate monomer [or methacrylamidopropyltrimethylammonium chloride monomer (50 wt.% solution in water)] in distilled water, wherein the total monomer concentration is about 1 to about 40 grams of total monomer per 100 grams of water, more preferably about 5 to about 30, and most preferably about 10 to about 20; purging the reaction solution with nitrogen; heating the reaction solution to 50° C. while maintaining the nitrogen purge; adding sufficient free radical initiator to the reaction solution at 50° C. to initiate copolymerization of the acrylamide monomer and sodium styrene sulfonate monomer, (or methacrylamidopropyltrimethyl ammonium chloride monomer); copolymerizing said monomers of acrylamide and sodium styrene sulfonate (or methacrylamidopropyltrimethylammonium chloride) at a sufficient temperature and for a sufficient period of time to form said water soluble copolymer; and recovering said water soluble copolymer from said reaction solution.

Copolymerization of the acrylamide monomer and sodium styrene sulfonate monomer, (or methacrylamidopropyltrimethylammonium chloride monomer) is conducted at a temperature of about 30° to about 90° C., more preferably at about 40 to about 70, and most preferably at about 50 to about 60 for period of time of about 1 to about 24 hours, more preferably about 3 to about 10, and most preferably about 4 to about 8.

A suitable method of recovery of the formed water soluble copolymer from the aqueous reaction solution comprises precipitation in acetone, methanol ethanol and the like.

Suitable free radical initiators for the free radical copolymerization of the acrylamide monomer, and sodium styrene sulfonate monomer, (or the methacrylamidopropyltrimethyl ammonium chloride monomer) are selected from the group consisting of potassium persulfate, ammonium persulfate, benzoyl peroxide, hydrogen peroxide, and azobisisobutyronitrile and the like. The concentration of the free radical initiator is about 0.001 to about 2.0 grams of free radical initiator per 100 grams of total monomer, more preferably about 0.01 to about 1.0 and most preferably about 0.05 to about 0.1.

It should be pointed out that neither the mode of polymerization (solution, suspension, or emulsion polymerization technique and the like), nor the initiation is critical, provided that the method or the products of the initiation step does not inhibit production of the copolymer or chemically modify the initial molecular structure of reacting monomers.

The interpolymer complex of the anionic copolymer and the cationic copolymer is typically formed by forming a first solution of the anionic copolymer in an aqueous solution. A second solution of the cationic copolymer is formed by dissolving the copolymer in an aqueous solution. The concentration of the anionic copolymer in the solution is about 0.001 to about 10.0 g/dl, more preferably about 0.01 to 5.0 g/dl, and most preferably about 0.1 to 4.0 g/dl. The concentration of the cationic copolymer in the second solution is about 0.001 to about 10.0 g/dl, more preferably about 0.01 to 5.0 g/dl, and most preferably about 0.1 to 4.0 g/dl. The first solution of the anionic copolymer and the second solution of the cationic copolymer are mixed together, thereby permitting the interaction of the anionic and cationic copolymers to form a water soluble interpolymer complex. Alternatively, both polymers can be simultaneously codissolved in water. The molar ratio of anionic monomer units in the copolymer to the cationic monomer units in the copolymer in the interpolymer complex is about 0.05 to 20, more preferably about 0.1 to about 10, and most preferably about 0.2 to about 5. The concentration of the interpolymer complex in the aqueous solution is about 0.01 to about 10 g/dl, more preferably about 0.1 to about 7, and most preferably about 0.2 to about 5.

An important characteristic of the materials employed in this invention is the stoichiometry of the ionic species when polymers (A) and (B) are blended together. A wide variation in such stoichiometries has been explored wherein the ratio of anionic/cationic species varies from 20/1 to 1.1/1 and 0.9/1 to 1/20. An even wider range of from 45/1 to 1.1/1 and 0.9/1 to 1/45 for such stoichiometries is believed to be within the scope of this invention.

Accordingly, the preferred ratio of the anionic/cationic can be from about 20/1 to 1.1/1 and about 0.9/1 to 1/20.

DESCRIPTION OF THE PREFERRED EMBODIMENTS

The following examples illustrate the present invention without; however limiting the same hereto.

EXAMPLE I

Copolymer Synthesis and Complex Preparation

A representative example for the synthesis of the anionically-charged acrylamide-sodium styrene sulfonate (SSS) copolymer is outlined below.

Into a one-liter, 4-necked flask add:
60 mole % acrylamide
40 mole % sodium styrene sulfonate
500 ml. distilled water.

The solution is purged with nitrogen gas for one hour to remove dissolved oxygen. As the nitrogen gas purge began, the solution is heated to 50° C. At this point, 0.05 g potassium persulfate is added to the solution. After 24 hours, the polymer is precipitated from solution with acetone. Subsequently, the resulting polymer is washed several times with a large excess of acetone and dried in a vacuum oven at 60° C. for 24 hours. Elemental analysis shows a sulfur content of 9.13 weight percent, which corresponds to 32.9 mole percent sodium styrene sulfonate.

A representative example for the synthesis of a cationically-charged acrylamide-methacrylamidopropyltrimethylammonium chloride (MAPTAC) copolymer is essentially identical to the previous polymerization, except for the substitution of SSS for an appropriate quantity of MAPTAC, as presented below.
90 mole % acrylamide
10 mole % MAPTAC (50% solution).
The reaction is carried out utilizing the above specifications. Elemental analysis shows a chlorine content of 1.68 weight percent corresponding to 3.7 mole percent MAPTAC.

As is well-known to those versed in the art, the level of ionic monomers incorporated in the growing polymer chain is directly related to the initial concentration of the reacting species. Therefore, modulation of the ionic charge within the polymer structure is accomplished through changes in the initial anionic or cationic vinylic monomer concentration.

The interpolymer complexes were formed by dissolving the appropriate weight of each copolymer into an aqueous solution to the desired polymer level. The solutions are added together and vigorously mixed. The specific overall charge level within this solution is calculated by assuming that a reaction will take place between all unlike charges leaving any residual charge unaffected. This assumption is quite reasonable since low-charge density copolymers are used in this instant invention.

EXAMPLE II

The following table is a typical example of the viscosity-shear rate behavior of an aqueous solution containing an interpolymer complex at 25° C. The complex was prepared so that the solution possessed a residual charge as designated by the ionic monomer molar ratio, i.e., SSS/MAPTAC:1.15/1.0. The polymer concentration was 1 g/dl.

| Shear Rate (sec$^{-1}$) | Viscosity (cps) |
|---|---|
| 3.0 | 360 |
| 6.0 | 310 |
| 9.0 | 280 |
| 12.0 | 270 |
| 22.0 | 230 |
| 30.0 | 265 |
| 50.0 | 290 |
| 75.0 | 310 |
| 105. | 260 |
| 110. | 240 |
| 225. | 180 |
| 250. | 160 |
| 300. | 150 |

The data shows that at relatively low shear rates, the viscosity drops as anticipated. However, the viscosity begins to rise at shear rates greater than approximately 22 sec$^{-1}$ (dilatant behavior). Further enhancement is observed even as the shear rate approaches 100 sec$^{-1}$. The individual copolymer components of the complex show a monotonic decrease in viscosity under identical experimental conditions. Therefore, it is readily observed that the soluble low-charge density interpolymer complex is effective as a dilatant fluid in aqueous solutions and, in addition, is an effective viscosifier over a wide shear rate range.

The mechanism for this viscosity enhancement in these solutions is believed to be due primarily to the increase in the apparent molecular weight of the complex through formation of intermolecular ionic linkages. The number of linkages increases through segmental orientation of the complex backbone in the shear field. Furthermore, the breadth of the viscosity enhancement is a direct function of the charge density level, molecular weight of the individual copolymer and the complex concentration. An increase in any of these factors will markedly enhance the viscosity-shear rate profile.

These types of polymeric materials may be useful as a dilatant agent in a variety of well control and workover fluids. Other areas of applications include fire fighting, drag reduction, hydraulic fluids, enhanced oil recovery, antimisting applications and a host of systems containing an aqueous solution.

What is claimed is:

1. A polymer complex in water which comprises the complexation in said water of:
  (a) a copolymer of a first water soluble polymer backbone and an anionic comonomer, said anionic comonomer is selected from the group consisting of styrene sulfonate, vinyl sulfonate, allyl sulfonate, acrylate and acrylamido-propyl sulfonate/2-acrylamido-2-methylpropane sulfonic acid, sodium styrene sulfonate, (meth)acrylic acid and 2-sulfoethylmethacrylate; and
  (b) a copolymer of a second water soluble polymer backbone and a cationic comonomer, wherein said cationic comonomer is selected from the group consisting of N,N,N-trimethylammoniumpropylmethacrylamide, vinyl pyridine/methacrylamidopropyltrimethylammonium chloride, dimethyldiallylammoniun chloride, diethyldiallylammonium chloride, 2-methacryloxy-2-ethyltrimethylammonium chloride, trimethylmethacryloxyethylammonium methsulfate, 2-acrylamido-2-methylpropyltrimethylammonium chloride and vinylbenzyltrimethylammonium chloride; wherein said first and said second nonionic water soluble polymer backbones are selected from the group consisting of acrylamide, vinyl pyrolidone, ethylene oxide, vinyl alcohol methacrylamide, alkyl substituted acrylamides, n-vinyllactones, methacrylates and N,N-dimethylacrylamide, wherein the molar ratio of the cationic comonomer in the first polymer to the anionic monomer in the second polymer is 20/1 to 1.1/1 or 0.9/1 to 1/20.

2. A polymer complex according to claim 1 wherein said water soluble polymer backbone is polyacrylamide.

3. A polymer complex according to claim 1 or 2, wherein the concentration of the polymer complex in the water is about 0.01 to about 10 grams per 100 ml of said solution.

4. A polymer complex according to claim 1 or 2, wherein the anionic copolymer contains about 0.1 to about 50 mole % anionic monomer units.

5. A polymer complex according to claim 1 or 2, wherein the cationic copolymer contains about 0.1 to about 50 mole % cationic monomer units.

6. A process for increasing the viscosity of water under increasing shear rates which comprises the step of adding to said water about 0.01 to about 10 grams of a polymer complex per 100 ml of said water, said polymer complex comprising:
  (a) a copolymer of a first water soluble polymer backbone and an anionic comonomer, said anionic comonomer is selected from the group consisting of styrene sulfonate, vinyl sulfonate, allyl sulfonate, acrylate and acrylamido-propyl sulfonate/2-acrylamido-2-methylpropane sulfonic acid, sodium styrene sulfonate, (meth)acrylic acid and 2-sulfoethylmethacrylate; and
  (b) a copolymer of a second water soluble polymer backbone and a cationic comonomer, wherein said cationic comonomer is selected from the group consisting of N,N,N-trimethylammoniumpropylmethacrylamide, vinyl pyridine/methacrylamidopropyltrimethylammonium chloride, dimethyldiallylammonium chloride, diethyldiallylammonium chloride, 2-methacryloxy-2-ethyltrimethylammonium chloride, trimethylmethacryloxyethylammonium methsulfate, 2-acrylamido-2-methylpropyltrimethylammonium chloride and vinylbenzyltrimethylammonium chloride; wherein said first and said second nonionic water soluble polymer backbones are selected from the group consisting of acrylamide, vinyl pyrolidone, ethylene oxide, vinyl alcohol methacrylamide, alkyl substituted acrylamides, n-vinyllactones, methacrylates and N,N-dimethylacrylamide, wherein the molar ratio of the cationic comonomer in the first polymer to the anionic monomer in the second polymer is 20/1 to 1.1/1 or 0.9/1 to 1/20.

* * * * *